W. G. STOCKHAM.
ARMOR FOR VEHICLE TIRES.
APPLICATION FILED JULY 3, 1920. RENEWED JUNE 30, 1921.

1,405,351.

Patented Jan. 31, 1922.

Inventor

W. G. Stockham.

By Lacey & Lacey, Attorneys

UNITED STATES PATENT OFFICE.

WILLIAM G. STOCKHAM, OF PIQUA, OHIO.

ARMOR FOR VEHICLE TIRES.

1,405,351.　　　　　　　　Specification of Letters Patent.　　Patented Jan. 31, 1922.

Application filed July 3, 1920, Serial No. 393,849. Renewed June 30, 1921. Serial No. 481,709.

*To all whom it may concern:*

Be it known that I, WILLIAM G. STOCKHAM, citizen of the United States, residing at Piqua, in the county of Miami and State of Ohio, have invented certain new and useful Improvements in Armors for Vehicle Tires, of which the following is a specification.

This invention relates to improvements in tire armors especially adapted for use in connection with solid tires.

An important object of this invention is to provide a tire armor especially adapted for application to solid tires and provided with novel means whereby the same may be readily and securely arranged about a solid tire without the necessity of employing unsightly fastening devices.

The invention forming the subject matter of this application aims also to provide a solid tire armor which comprises a plurality of segmental sections having outwardly directed cleats adapted to engage the ground for affording good traction between the wheel and the ground.

A further object of the invention is to provide a tire armor of the class described which is of highly simplified construction, cheap to manufacture and durable in use.

Other objects and advantages of the invention will be apparent during the course of the following description.

In the accompanying drawing forming a part of this application and in which like numerals are employed to designate like parts throughout the same, Figure 1 is a side elevation of a vehicle wheel having the improved tire armor applied thereto, Figure 2 is a fragmentary perspective of the improved tire armor.

Figure 4:
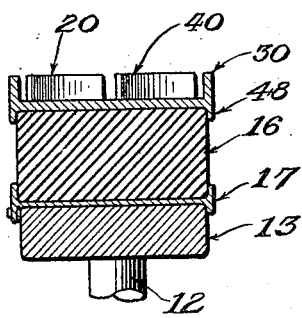
Figure 4 is a vertical detail section through the wheel having a slightly modified form of tire armor.

In the drawing, wherein for the purpose of illustration is shown a preferred embodiment of the invention, the numeral 10 generally designates a vehicle wheel which includes a hub 11, spokes 12 and the usual felly 13. As illustrated in Figure 4, a solid tire 16 mounted upon a rim 17 is arranged about the felly 13 and under ordinary circumstances forms the ground engaging means for the wheel.

The improved tire armor comprises a plurality of arcuate sections 20 which are adapted to be detachably arranged about the tread of the solid tire 16 so as to protect the same against ice, stones, and the like, and so as to provide good traction between the wheel and the ground. The arcuate sections may be two or more in number and each section has its ends extended upwardly to form connecting flanges 22. The connecting flanges 22 which extend diagonally of the tire, are formed with apertures 24 which receive connecting bolts 26 having engagement with nuts 28. The connecting flanges 22 also serve as a means for providing traction between the wheel and the ground since they are flush with the outwardly directed flanges 30 formed along the edge portions of the sections.

Figure 1:
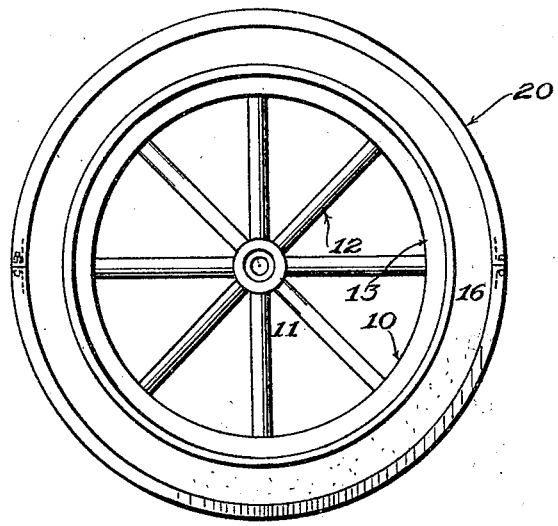
Figure 2:
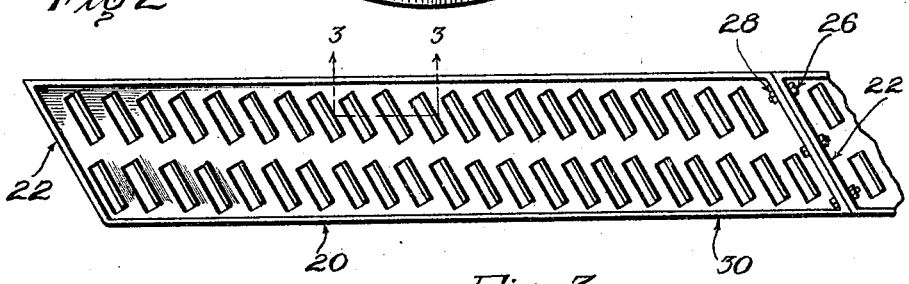
Figure 3:
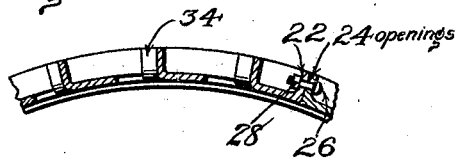
Figure 3 is a detail section taken on line 3—3 of Figure 2.

As illustrated in Figures 2 and 3, each segmental section is provided with a plurality of struck up diagonally extending cleats 34 which have their outer edges terminating flush with said outwardly directed flanges 30 so as to present a uniform ground engaging surface. The struck up flanges or cleats 34 are relatively short and are arranged in rows so as not to weaken the arcuate sections or the cleats and so as to enable the cleats to withstand the strain incident to engaging the ground.

In the form of the invention illustrated in Figure 4, each arcuate section is formed with a plurality of cleats 40 which may be integral or which may be welded to the outer side of the sections. In forming the cleats 40 on the outer side of the arcuate sections no openings are formed in the cleats through which dirt and the like may pass.

Figure 5:
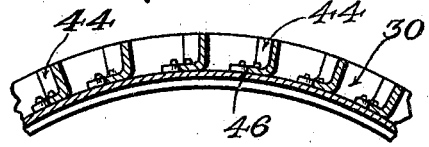
Figure 5 is a fragmentary detail section through the tire armor detached, the same being provided with a slightly modified form of ground engaging means.

A further modification of the invention is illustrated in Figure 5 wherein each arcuate section is provided with diagonally extending cleats in the form of angle irons 44. One flange of each angle iron is rigidly secured to the arcuate sections by means of rivets 46 and the other flange of the angle iron is extended outwardly and has its outer edge flush with the outwardly directed flanges 30 so as to provide a uniform ground engaging surface.

In applying the improved tire armor, it is merely necessary to arrange the several arcuate sections about the tire with the inwardly directed flanges 48 of the same upon opposite sides of the tire so that lateral movement of the several sections is prevented. The diagonally extending flanges 22 may now be connected by means of the bolts and nuts 26 and 28 and when the several sections are so connected, the same will be held securely in position and will be prevented from rotary or lateral movement with relation to the tire.

In the use of the device, the same will absolutely prevent the tire from becoming cut or lacerated as the result of running over ice, stones, or the like. Since the device is constructed of a plurality of arcuate sections, the same may yield to some extent to take up the shocks incident to the travel of a vehicle over rough roads.

It is to be understood that the forms of the invention herewith shown and described are to be taken as a preferred example of the same and that such minor changes in arrangement and construction of parts may be made as will remain within the spirit of the invention and the scope of what is claimed.

Having thus described the invention, what is claimed as new is:

1. A tire armor comprising a plurality of arcuate sections having their end portions formed with diagonal connecting flanges, fastening devices extending through said diagonal connecting flanges, the longitudinal edge portions of said arcuate sections being formed with outwardly directed flanges having their outer sides flush with said diagonal connecting flanges, said arcuate sections being formed with outwardly directed ground-engaging cleats having their outer edges flush with the outer edges of said first and second named flanges, and inwardly directed retaining flanges formed along the longitudinal edges of said sections.

2. A tire armor comprising arcuate connected sections having their longitudinal edges formed with inwardly and outwardly extending flanges, and series of diagonal cleats formed on said sections between and free of and cooperating with said outwardly directed flanges in forming traction devices, said inwardly directed flanges constituting a retaining means.

3. A tire armor comprising arcuate sections having their end portions formed with outwardly directed connecting flanges, fastening devices extending through said connecting flanges, the longitudinal edge portions of said arcuate sections being formed with outwardly extending flanges having their outer sides flush with said connecting flanges, and cleats formed on said sections and being flush with said first and second named flanges, said flanges and said cleats constituting a traction device.

In testimony whereof I affix my signature.

WILLIAM G. STOCKHAM. [L. S.]